(12) United States Patent
Vithal et al.

(10) Patent No.: US 6,942,843 B2
(45) Date of Patent: Sep. 13, 2005

(54) PREPARATION, CHARACTERIZATION, ESR AND PAS STUDIES OF $CU_{0.5}NBALP_3O_{12}$ (CNP) AND $HNBALP_3O_{12}$ (HNP)

(75) Inventors: M. Vithal, Andhra Pradesh (IN); B. Srinivasulu, Andhra Pradesh (IN); K. Koteswara Rao, Andhra Pradesh (IN); Chandra Mohan Rao, Andhra Pradesh (IN)

(73) Assignee: Council of Scientific and Industrial Research, New Delhi (IN)

(*) Notice: Subject to any disclaimer, the term of this patent is extended or adjusted under 35 U.S.C. 154(b) by 112 days.

(21) Appl. No.: 10/109,544

(22) Filed: Mar. 28, 2002

(65) Prior Publication Data

US 2003/0086854 A1 May 8, 2003

Related U.S. Application Data

(60) Provisional application No. 60/279,271, filed on Mar. 28, 2001.

(51) Int. Cl.$^7$ .............................. C01B 25/36; C01B 25/45
(52) U.S. Cl. ................................................. 423/306
(58) Field of Search ............................... 423/306, 307; 502/345, 346, 353, 354

(56) References Cited

U.S. PATENT DOCUMENTS 5,550,308 A * 8/1996 Agaskar et al. ............. 585/623

* cited by examiner

*Primary Examiner*—Stanley S. Silverman
*Assistant Examiner*—Maribel Medina
(74) *Attorney, Agent, or Firm*—Ladas & Parry LLP

(57) ABSTRACT

The present invention relates to the process of preparation and characterization of novel sodium superionic conductor (NASICON) type niobium aluminium phosphate of formula $Cu0.5NbAlP_3O_{12}$ (CNP), $HNbAlP_3O_{12}$ (HNP) and to study its Electron Spin Resonance (ESR) and Photo Acoustic (PA) spectra.

11 Claims, 3 Drawing Sheets

Powder X-ray diffractograms of (a) CNP and (b) HNP.

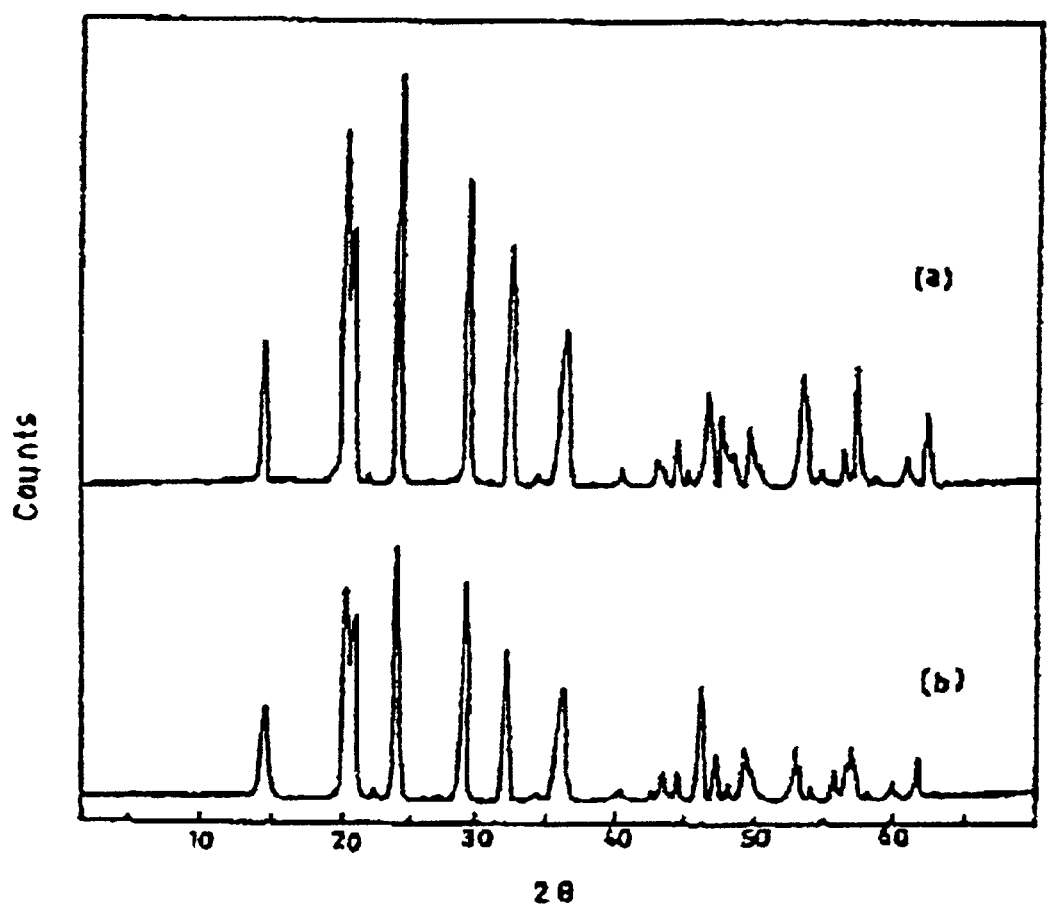
Fig. 1. Powder X-ray diffractograms of (a) CNP and (b) HNP.

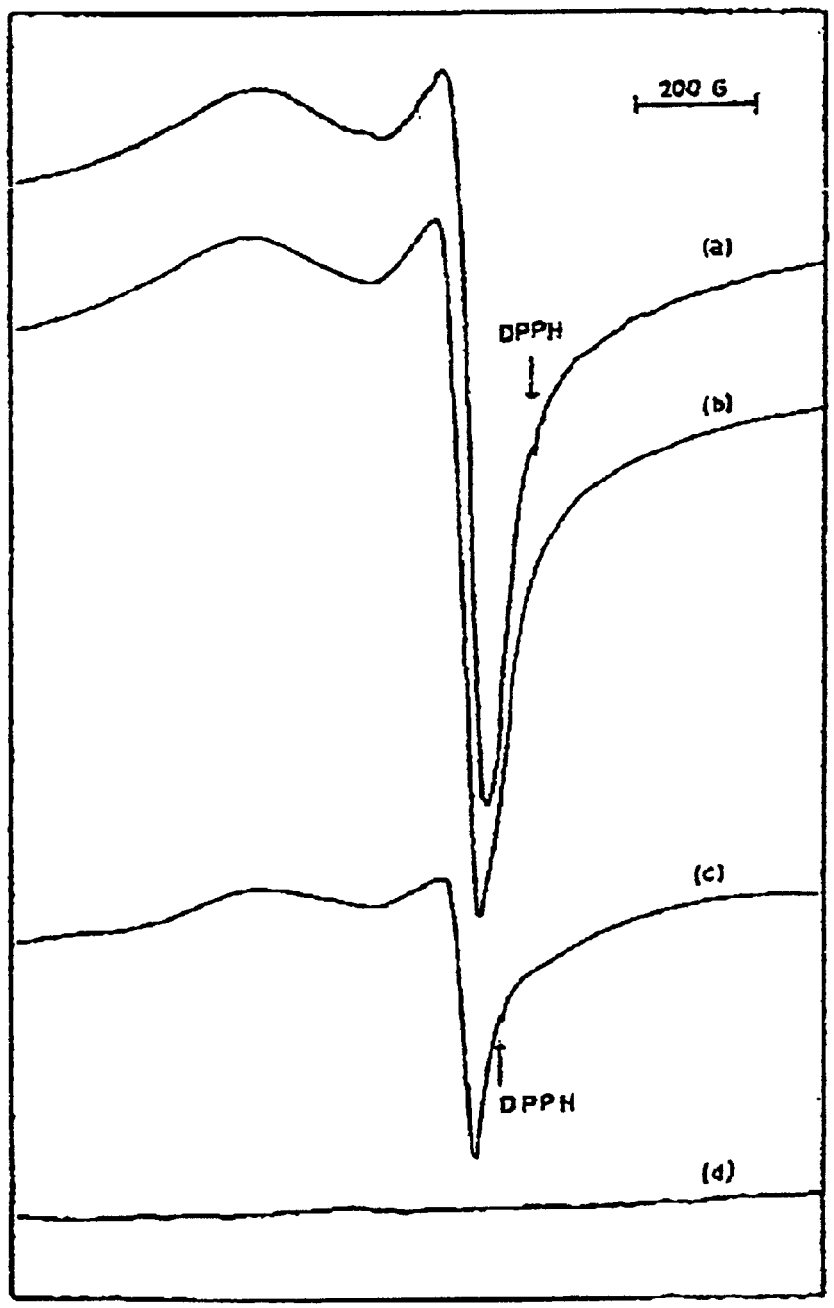
Fig. 2. Room temperature electron spin resonance spectra of (a) CNP. (b) simulated ESR spectra of CNP. (c) CNP heated at 450°C and (d) HNP.

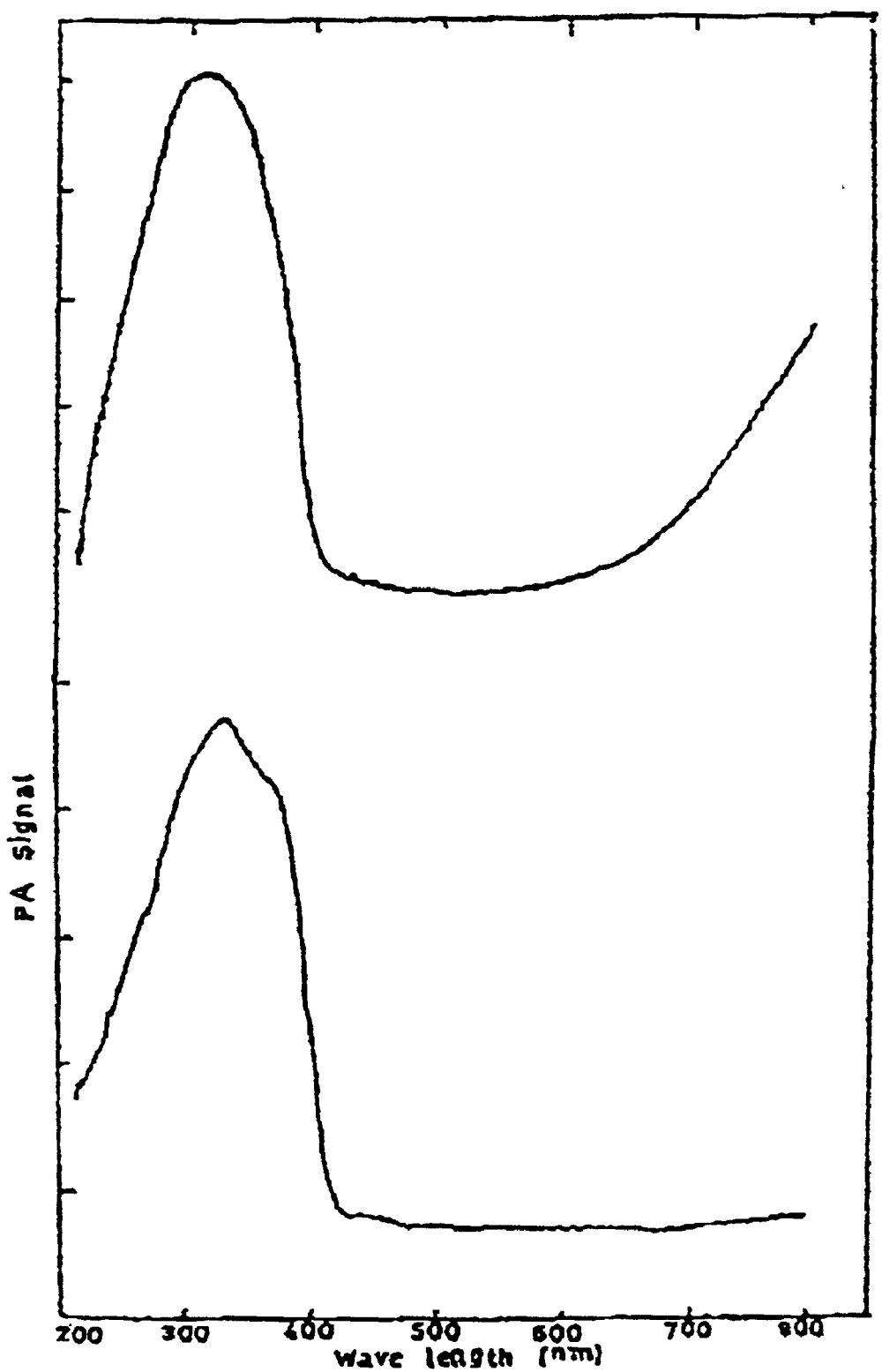
Fig. 3. PA spectra of (a) CNP and (b) HNP.

PREPARATION, CHARACTERIZATION, ESR AND PAS STUDIES OF $CU_{0.5}NBALP_3O_{12}$ (CNP) AND $HNBALP_3O_{12}$ (HNP)

This application claims the benefits Provisional Application No. 60/279,271, filed Mar. 28, 2001.

FIELD OF THE INVENTION

The present invention relates to the process of preparation, characterization, electron spin resonance (ESR) and photo acoustic (PA) studies of $Cu_{0.5}NbAlP_3O_{12}$ (CNP) and $HNbAlP_3O_{12}$ (HNP).

BACKGROUND AND PRIOR ART TO THE INVENTION

Sodium super ionic conductor (NASICON) and related sodium zirconium phosphate $NaZr_2P_3O_{12}$ (NZP) and niobium titanium phosphate $NbTiP_3O_{12}$ are well studied [1–6] due to their important properties of (i) low thermal expansion behavior [5–9], (ii) fast ionic conductivity [2] and (iii) high temperature stability [2]. They are used as heat exchangers and I mirror blanks for space technology, catalyst supports, high temperature fuel cells, possible host for radioactive waste and as humidity and gas sensors [10–15]. Their general formula is $AMM'P_3O_{12}$ where, 'A' can be alkali, alkaline earth or $Cu^{2+}$ ion, M and M' can be tri-, tetra- or pentavalent transition metal ion. The structure is characterized by corner sharing of $PO_4$ tetrahedra with $MO_6$, (and $M'O_6$,) octahedrai [16,17]. The three dimensionally linked interstitial space can accommodate ions as $H^+$ or as large as Cs+ This space can also remain vacant as in $NbTiP_3O_{12}$ [18]. The structure is flexible for substitution at A, M or M' sites, giving rise to a large number of closely related compounds. Among the NASICONs, copper NASICONs are relatively less investigated [19–22]. In this paper, we report the preparation, characterization, electron spin resonance (ESR) and photo acoustic (PA) studies of $Cu_{0.5}-NbAlP_3O_{12}$ (CNP) and $HNbAlP_3O_{12}$ (HNP).

REFERENCE

1. Vashishta, J. N. Mundy, O. K. Shenoy (Eds.). Proceedings of International Conference on Fast Ion Transport in Solids, Lake Geneva, North-Holland, Amsterdam, 1979.
2. J. B. Goodenough, H. Y. P. Hong, J. A. Kafalas. Mater. Res. Bull. 11 (1976) 203.
3. H. Y. P. Hong. Mater. Res. Bull. 11 (1976) 176.
4. J. Alamo, R. Roy, J. Am. Ceram. Soc. 67 (1984) C78.
5. T. Oota, I. Yamai, J. Am. Ceram. Soc. 69 (1986) 1.
6. R. Roy, D. K. Agrawal, R. A. Roy. Mater. Res. Bull. 19 (1984) 471.
7. D. K. Agrawal, V. S. Stubican, Mater. Res. Bull. 20 (1985) 99.
8. G. E. Lenain, H. A. McKinstry, S. Y. Limaye, A. Woodword, Mater. Res. Bull. 19 (1984) 1451.
9. S. Y. Limaye, D. K. Agrawal, H. A. Mckinstry. J. Am. Ceram. Soc. 70(1987) C232.
10. D. K. Agrawal, J. H. Adair, J. Am. Chem. Soc. 71(1990) 2153.
11. R. Roy. E. R. Vance. J. Alamo. Mater. Res. Bull. 17 (1982) 585.
12. L. Fred, Y. Akihiri, M. Norrio, Y. Nobni, Chem. Lett. 49 (1994) 1173.
13. Y. Hideaki, S. Takehiko, Sens. Actuators, B 5(1991) 135.
14. Y. Sheng, S. Youichi, M. Norrio, Y. Nobru, Chem. Lett. 47; (1992) 587.
15. Y. Sheng, H. Sanchio, S. Youichi, M. Norrio, F. Hozumi, Y. I. Nobru, Chem. Lett. 46 (1991) 2069.
16. L. O. Hagman, P. Kierkegaard, Acta Chem. Scand. 22 (1968) 1822.
17. M. Sljukic, B. Matkovic, B. Prodic, Z. Kristallogr, 130 (1968) 1872.
18. R. Masse, A. Durif, J. C. Guitel, I. Tordjman. Bull. Soc. Fr. Mineral. Cristallogr. 95 (1972) 47.
19. P. C. Yao, D. J. Fray. Solid State Ionics 8 (1983) 35.
20. A. El Jazouli, J. L. Soubeyroux, J. M. Dance, G. Le Flem, J. Solid State Chem. 65 (1986) 351.
21. A. El Jazouli, M. Alami, R. Brochu, J. M. Dance, G. Le Flem, P. Hagenmuller. J. Solid State Chem. 71 (1987) 444.
22. G. Le Polles, A. El Jazouli, R. Olazcuaga, J. M. Dance, G. Le Flem, P. Hagenmuller, Mater. Res. Bull. 22 (1987) 1171.
23. J. R. Pilbrow, Transition Ion Electron Paramagnetic Resonance, Oxford Science Publications. 1990, Chap 5.
24. A. Clearfield, B. D. Roberts, M. A. Subramanian, Mater. Res. Bull. 19(1984) 219.

OBJECTS OF THE INVENTION

The main object of the present invention is to provide a process of preparation, characterization, electron spin resonance (ESR) and photo acoustic (PA) studies of $Cu_{00.5}NbAlP_3O_{12}$ (CNP) and $HNbAlP_3O_{12}$ (HNP).

Another object of the present invention relates to a novel sodium superionic conductor (NASICON) type niobium aluminum phosphate and a method for preparation of the same.

Still another object of the present invention is to characterize the above said compound.

Yet another object of the present invention is to study the electron spin resonanace (ESR) and photoacoustic (PA) characters of the said compound.

SUMMARY OF THE INVENTION

The present invention relates to the process of preparation, characterization, electron spin resonance (ESR) and photo acoustic (PA) studies of compounds $Cu_{0.5}NbAlP_3O_{12}$ (CNP) and $HNbAlP_3O_{12}$ (HNP).

DESCRIPTION OF THE ACCOMPANYING DRAWINGS

In the drawings accompanying the specification,

FIG. 1 represent the Powder X-ray diffractogram of (a) CNP and (b) HNP.

FIG. 2 represent the room temperature electron spin resonance spectra of (a) CNP, (b) simulated ESR spectra of CNP, (c) CNP heated at 450° C. and (d) HNP.

FIG. 3 represent the PA spectra of (a) CNP and (b) HNP.

DETAILED DESCRIPTION OF THE INVENTION

In an embodiment, the present invention relates to the process of preparation, characterization, electron spin resonance (ESR) and photo acoustic (PA) studies of a novel sodium super ionic conductor (NASICON) type niobium aluminum phosphates of the composition $Cu_{0.5}NbAlP_3O_{12}$ (CNP) and $HNbAlP_3O_{12}$ (HNP).

In one embodiment, the said compounds are isomorphous with $NbTiP_3O_{12}$ and unit cell parameters are evaluated. Copper and hydrogen occupy the channels. Reduction of CNP gives rise of HNP. Electron spin resonance (ESR) and photo acoustic (PA) spectral data are consistent with elongated octahedral configuration around $Cu^{2+}$ ion.

In another embodiment, CNP is prepared by mixing stoichiometric amounts of $Nb_2O_5$, $Al_2O_3$, $NH_4H_2PO_4$ and $Cu(NO_3)_2 3H_2O$ (all are analytical reagents obtained from SD chemicals) in a mortar with spectral grade acetone (SD chemicals). The resultant powder was sequentially heated at 500° C. (3 h), 750° C. (3 h) and finally 1075° C. (5 h). This process resulted in $Cu_{0.5}NbAlP_3O_{12}$(CNP) as a light green compound.

In yet another embodiment HNP is prepared from CNP by placing it in a ceramic boat and reducing at 400° C. and 550° C. (4 h each) by passing hydrogen gas in a tube furnace. The compound obtained by reducing at 550° C. was HNP and was light black in color.

In a yet another embodiment, density of CNP was experimentally determined using xylene as the immersion liquid. Powder X-ray diffractograms were recorded on Siemens D-4000 using $CuK_\alpha$ radiation ($\lambda$=1.506 Å). The unit cell parameters are derived by using a computer programme by providing d and hkl values as input parameters.

In still yet another embodiment, room temperature ESR spectra were recorded on a JEOL PE-3X-band spectrometer equipped with a 100 kHz field modulation unit. DPPH was used as standard. The powder ESR spectrum of CNP was simulated using a computer programme [23]. The "g", "a" and line width are given as input parameters. Room temperature emission spectra were recorded by Hitachi-3010 spectrofluorometer.

In still yet another embodiment, PA spectra were recorded on an extensively modified OAS-400 PA spectrometer (EDT Research, London). The light beam from a 300-W xenon lamp was intensity-modulated using a continuously variable mechanical chopper (HMS 222, NY) operating at a chopping frequency of 40 Hz. The signals were recorded using a B and K 4165 microphone (Bruel and Kjaer, Naerum, Denmark) coupled to a power supply (B and K 2804). The sensitivity of the microphone was 40 mV/Pa. The signal was processed through a preamplifier (EG and G 113); Princeton applied Research, Princeton, N.J. and a lock-in analyzer EG and G 7620. Normalization of the spectra to constant input light intensity was achieved by using the PA spectrum of carbon black.

Powder XRD of CNP was found to be free from impurities. It is found to be isomorphous with $NbTiP_3O_{12}$ [18]. All the d-lines are indexed and the unit cell parameters are evaluated using a computer programme. The observed and calculated d-values are given in Table 1. The unit cell parameters are shown in Table 2 along with the unit cell parameters of related systems. The powder XRD of HNP was found to be similar to that of CNP, except for the intensities. The reflections of various hkl planes of HNP were less intense than CNP (FIG. 1). All the d-lines are indexed and the unit cell parameters are derived (Tables 1 and 2). From Table 2, it is clear that the unit cell parameters of CNP and HNP are very close to each other. Since both $Cu^{2+}$ and $H^+$ occupy the channels, the basic skeleton remains the same and, hence, the "a" and "c" parameters are close to each other. The observed change in the intensities may be due to the difference in the number of electrons present in $Cu^{2+}$ and $H^+$.

TABLE 1

Experimental and calculated d-values of CNP and HNP

| | CNP | | HNP | |
|---|---|---|---|---|
| h k l | $d_{obs}$ | $d_{cal}$ | $d_{obs}$ | $d_{cal}$ |
| 102 | 6.096 | 6.125 | 6.127 | 6.127 |
| 104 | 4.383 | 4.405 | 4.407 | 4.406 |
| 110 | — | 4.261 | 4.283 | 4.262 |
| 113 | 3.678 | 3.682 | 3.691 | 3.683 |
| 204 | 3.147 | 3.063 | 3.065 | 3.063 |
| 116 | 2.770 | 2.776 | 2.778 | 2.777 |
| 108 | — | 2.573 | — | 2.573 |
| 214 | 2.480 | 2.486 | 2.484 | 2.487 |
| 300 | — | 2.460 | — | 2.461 |
| 208 | 2.239 | 2.202 | 2.215 | 2.203 |
| 119 | 2.108 | 2.117 | 2.120 | 2.118 |
| 217 | 2.089 | 2.084 | 2.078 | 2.085 |
| 223 | 2.046 | 2.045 | — | 2.046 |
| 306 | 2.014 | 2.041 | — | 2.042 |
| 312 | 2.014 | 2.012 | 2.013 | 2.013 |
| 218 | 1.954 | 1.956 | 1.962 | 1.957 |
| 314 | 1.918 | 1.917 | 1.920 | 1.918 |
| 2010 | 1.895 | 1.887 | — | 1.887 |
| 226 | 1.841 | 1.841 | 1.845 | 1.841 |
| 402 | — | 1.819 | — | 1.820 |
| 2110 | 1.721 | 1.725 | 1.726 | 1.726 |
| 317 | — | 1.714 | — | 1.714 |
| 1112 | 1.679 | 1.681 | 1.679 | 1.681 |
| 318 | 1.642 | 1.641 | 1.640 | 1.641 |
| 324 | 1.616 | 1.617 | 1.617 | 1.618 |
| 410 | 1.590 | 1.610 | | |
| 325 | 1.575 | 1.579 | | |
| 413 | — | 1.572 | | |
| 408 | 1.528 | 1.531 | | |
| 3110 | 1.496 | 1.497 | | |

TABLE 2

Unit cell parameters of CNP, HNP and related systems

| Compound | a (Å) ± 0.02 | c(Å) ± 0.02 | $d_{obs}$ (g $cm^{-3}$) ± 0.02 | $d_{cal}$ (g $cm^{-3}$) | Reference |
|---|---|---|---|---|---|
| $Cu_{0.5}Zr_2P_3O_{12}$ | 8.84 | 22.77 | 3.24 ± 0.20.02 | 3.23 | [21] |
| $H_{0.5}Cu_{0.5}Zr_2P_3O_{12}$ | 8.84 | 22.75 | — | — | [22] |
| $Cu_{0.5}NbAlP_3O_{12}$ | 8.522 | 21.964 | 4.035 ± 0.02 | 4.05 | This work |
| $HNbAlP_3O_{12}$ | 8.526 | 21.966 | — | 3.90 | This work |
| $HZr_2P_3O_{12}$ | 8.80 | 23.23 | — | — | [24] |
| $Cu_{0.5}Ti_2P_3O_{12}$ | 8.41 | 21.88 | 3.05 ± 0.01 | 3.07 | [20] |

Room temperature X-band powder ESR spectrum of CNP and its reduced product at 400° C. and 550° C. are shown in FIG. 2. The ESR spectrum of CNP is characterized by a broad unresolved band at lower magnetic field and a sharp one on the higher field side (FIG. 2a). This spectrum is similar to that of $Cu_{0.5}Ti_2P_3O_{12}$ [20.21]. The g values are derived and shown in Table 3. Since $g_{\parallel}>g\perp$, the unpaired electron is in $d_x^2-y^2$, which corresponds to the John-Teller distortion involving an elongated octahedral configuration around $Cu^{2+}$ ion. Similar results were obtained for other related systems [20,21]. The room temperature powder ESR spectrum of CNP is simulated using a computer programme (FIG. 2b). The ESR spectrum of the sample of reduced product at 400° C. was found to be identical to that of CNP, except for the intensities (FIG. 2c). The compound reduced at 550° C. did not give any ESR signal (FIG. 2d).

In copper NASICON type phosphates, $Cu^{+2}$ ion occupy the channels [21]. In reducing with hydrogen, CNP can give rise to (i) $H_{0.5}Cu_{0.5}(I)NbAlP_3O_{12}$ or (ii) $HNbAlP_3O_{12}$ or a mixture of both. The samples reduced at 400° C. and 550°

C. were subjected to fluorescence measurement by exciting at 287 nm. No signal was observed around 450–700 nm unlike $H_{0.5}Cu_{0.5}(I)Zr_2P_3O_{12}$ [22]. Copper (I) hydrogen NASICONs, when heated in air, are known to give copper (II) NASICONs expelling the hydrogen [22]. When the sample (CNP) reduced at 550° C. is heated in air and subjected to ESR, no signal was observed. This rules out the formation of $H_{0.5}Cu_{0.5}(I)NbAlP_3O_{12}$. Therefore, the compound formed when CNP is reduced at 550° C. is unambiguously identified at $HNbAlPO_{12}$.

TABLE 3

The g value of some NASICON type phosphates

| Sample | g∥ | g⊥ | $g_{av}$ | T(K) | Reference |
|---|---|---|---|---|---|
| $NaTi_2P_3O_{12}:Cu^{2+}$ | 2.366 | 2.072 | 2.174 | 300 | [20] |
| $CuTi_2P_3O_{12}:Cu^{2+}$ | 2.36 | 2.06 | 2.164 | 300 | [20] |
| $CaTi_2P_3O_{12}:Cu^{2+}$ | 2.37 | 2.06 | 2.168 | 300 | [20] |
| $Cu_{0.5}Ti_2P_3O_{12}$ | 2.33 | 2.067 | 2.158 | 300 | [20] |
| $Cu_{0.5}NbAlP_3O_{12}$ | 2.366 | 2.10 | 2.192 | 300 | this work |
| $HNbAlP_3O_{12}$ | — | — | — | 300 | this work |

In yet another embodiment, the PA spectra of CNP and HNP are recorded in the range 210–800 nm (FIG. 3). The PA spectrum of CNP consists of broad band around 250–400 nm and of another broad band above 600 nm (FIG. 3a). PA spectrum of HNP is characterized by broad band around 300–450 nm. No band is observed above 600 nm (FIG. 3b).

In still another embodiment, the optical spectrum of copper NASICONs is characterized by a broad band of around 200–400 nm and of another between 600 and 1100 nm [20–22]. The broad band (200–400 nm) is due to phosphate group and its location is independent of the nature of the cation. The broad band in the region 60–1100 nm is due to d—d transitions [20–22]. The PA spectrum of CNP is identical to the reflectance spectrum of $Cu_{0.5}Zr_2P_3O_{12}$ [21]. We could record PA spectrum up to 800 nm only due to instrumental constraints. However, the profile of the spectrum shows the transitions due to phosphates group and d-d transitions of $Cu^{2+}$ ($3d^9$) in high spin octahedral configuration. The broad band observed in the PA spectrum of HNP in the region 300–450 nm is due the phosphate group. The absence of band above 600 nm indicates the absence of $Cu^{2+}$ ions in HNP.

In a further embodiment, the possible mechanism for the formation of $HNbAlP_3O_{12}$ is as follows. When CNP is heated with hydrogen at various temperature $CU^{2+}$ions are reduced to elemental copper and are coming out of the channels. Once the reduction is complete, the compound becomes light black, since it is a mixture of Cu and $HNbAlP_3O_{12}$. This black mixture, when dissolved in dilute nitric acid, gives a blue color solution and white solid. The powder XRD of both black mixture and white solid are identical. Thus, the white solid is $HNbAlP_3O_{12}$. The sequence of reactions can be written as

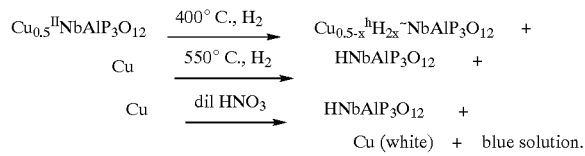

The invention is described by the following examples, which should not be construed as limitations to the scope of the invention.

EXAMPLE 1

In another embodiment, CNP is prepared by mixing stoichiometric amounts of $Nb_2O_5$, $Al_2O_3$, $NH_4H_2PO_4$ and $Cu(NO_3)_2 3H_2O$ (all are analytical reagents obtained from SD chemicals) in a mortar with spectral grade acetone (SD chemicals). The resultant powder was sequentially heated at 500° C. (3 h), 750° C. (3 h) and finally 1075° C. (5 h). This process produced $Cu_{1.5}NbAlP_3O_{12}$ light green compound.

EXAMPLE 2

In yet another embodiment HNP is prepared from CNP by placing it in a ceramic boat and reducing at 400° C. and 550° C. (4 h each) by passing hydrogen gas in a tube furnace. The compound obtained by reducing at 550° C. was HNP and was light black in color

We claim:

1. A compound as a sodium super ionic conductor (NASICON) type selected from compounds of the formula $Cu_{0.5}NbAlP_3O_{12}$ (CNP) and $HNbAlP_3O_{12}$ (HNP).

2. A compound as claimed in claim 1, characterized by experimental and calculated d-values of Table 1.

3. A compound as claimed in claim 1 characterized by the unit cell parameters of Table 2.

4. A compound as claimed in claim 1 characterized by the g values of Table 3.

5. The CNP compound as claimed in claim 1, wherein the density of CNP is determined using Xylene immersion liquid.

6. Compounds as claimed in claim 1, wherein powdered XRD of CNP and HNP are similar except for intensities of one or more hkl planes.

7. Compounds as claimed in claim 1, wherein the unit cell parameters of CNP and HNP are very close to each other.

8. The CNP compound as claimed in claim 1 wherein photoacoustic spectra of CNP is characterized by a broad band around a wave length of 250–400 nm, a broad band around a wave length of 250–400 nm and a broad band above 600 nm.

9. The HNP compound as claimed in claim 1 wherein the photo acoustic spectrum of HNP is characterized by a broad band around a wavelength of 300–450 nm.

10. The compounds as claimed in claim 1 wherein the CNP is light green colored and HNP obtained is light black or white colored after treatment with nitric acid.

11. A process for preparation of the compounds of claim 1, said process comprises the steps of:

a) mixing stoichiometric amounts of $Nb_2O_5$, $Al_2O_3$, $NH_4H_2PO_4$ and $Cu (NO_3)_2 3H_2O$ in the presence of spectral grade organic solvent to obtain a powder, b) heating the powder of step (a) sequentially to 500° C. for a period of 3–4 hrs, followed by 750° C. for a period of 5–6 hrs to obtain $Cu_{0.5}NbAlPO_3O_{12}$ (CNP) as a light green solid, c) reducing the solid of step (b) in a ceramic boat using a stream of hydrogen gas in a tube furnace by heating to 400° C. for a period of 3–4 hrs and finally to 550° C. for 3–4 hrs to obtain $HNbAlP_3O_{12}$ (HNP) as a light black solid;

d) optionally treating the solid of step (c) with nitric acid to obtain a solution containing a second solid, and e) separating the second solid of step (d) from the solution to obtain white colored $HNbAlP_3O_{12}$ (HNP).

* * * * *